US012254812B2

(12) United States Patent
Chien et al.

(10) Patent No.: US 12,254,812 B2
(45) Date of Patent: Mar. 18, 2025

(54) DISPLAY APPARATUS AND CONTROL DEVICE AND CONTROL METHOD THEREOF

(71) Applicant: Novatek Microelectronics Corp., Hsinchu (TW)

(72) Inventors: Tso-Hua Chien, Hsinchu (TW); Po-Sheng Liao, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 18/357,166

(22) Filed: Jul. 24, 2023

(65) Prior Publication Data

US 2024/0355259 A1 Oct. 24, 2024

Related U.S. Application Data

(60) Provisional application No. 63/460,596, filed on Apr. 19, 2023.

(51) Int. Cl.
*G09G 3/20* (2006.01)

(52) U.S. Cl.
CPC ... *G09G 3/2092* (2013.01); *G09G 2310/0267* (2013.01); *G09G 2310/0275* (2013.01); *G09G 2330/021* (2013.01)

(58) Field of Classification Search
CPC ......... G09G 3/2092; G09G 2310/0267; G09G 2310/0275; G09G 2330/021; G09G 3/3677
See application file for complete search history.

(56) References Cited

U.S. PATENT DOCUMENTS

| | | | | |
|---|---|---|---|---|
| 9,325,311 | B1 * | 4/2016 | Konoshita | G09G 3/3677 |
| 9,466,252 | B2 * | 10/2016 | Yamashita | G09G 3/3648 |
| 10,847,074 | B2 * | 11/2020 | Lee | G09G 3/3677 |
| 11,373,578 | B2 * | 6/2022 | Ka | G09G 3/3266 |
| 2012/0280952 | A1 * | 11/2012 | Hsu | G09G 3/344 345/204 |

(Continued)

FOREIGN PATENT DOCUMENTS

| | | |
|---|---|---|
| CN | 115691428 | 2/2023 |
| TW | 202203192 | 1/2022 |

OTHER PUBLICATIONS

"Office Action of Taiwan Counterpart Application", issued on Jun. 7, 2024, p. 1-p. 3.

*Primary Examiner* — Jose R Soto Lopez
(74) *Attorney, Agent, or Firm* — JCIPRNET

(57) ABSTRACT

A display apparatus and a control device and a control method thereof are provided. A controller of the control device controls a gate driver of a display panel. The controller selects a first selected frame and a second selected frame in each frame group, wherein an adjacent position between a first partition and a second partition of the display panel corresponds to a corresponding time point in each frame of the first selected frame and the second selected frame. The controller transmits a reset pulse to the first gate driver at the corresponding time point in the second selected frame to clear a scanning pulse in the gate driver, and cancels the reset pulse at the corresponding time point in the first selected frame. Thus, the control device enables different display partitions of the display panel to have different frame rates or refresh rates.

27 Claims, 10 Drawing Sheets

(56) References Cited

U.S. PATENT DOCUMENTS

| | | | | |
|---|---|---|---|---|
| 2013/0293529 | A1* | 11/2013 | You | G09G 3/20 345/212 |
| 2016/0042707 | A1* | 2/2016 | Wang | G09G 3/3266 345/214 |
| 2018/0197455 | A1* | 7/2018 | Han | G09G 3/2085 |
| 2021/0035488 | A1* | 2/2021 | Seo | G09G 3/3225 |
| 2022/0028314 | A1 | 1/2022 | Kwon et al. | |
| 2023/0026989 | A1 | 1/2023 | Guo et al. | |
| 2023/0098040 | A1* | 3/2023 | Zhou | G09G 3/3233 345/55 |

* cited by examiner

DISPLAY APPARATUS AND CONTROL DEVICE AND CONTROL METHOD THEREOF

CROSS-REFERENCE TO RELATED APPLICATION

This application claims the priority benefit of U.S. provisional application Ser. No. 63/460,596, filed on Apr. 19, 2023. The entirety of the above-mentioned patent application is hereby incorporated by reference herein and made a part of this specification.

BACKGROUND

Technical Field

The disclosure relates to an electronic apparatus, and more particularly, to a display apparatus and a control device and a control method thereof.

Description of Related Art

On a traditional display panel, all display panel display one or more images at the same frame rate. In some applications, such as mobile phone applications, the entire display panel may be divided into multiple partitions, but different partitions all display images at the same frame rate. In many usage scenarios, often only one partition requires frequent screen refresh (e.g., playing animations), while the other partition is a static screen that does not require frequent refresh. When all display areas (all partitions) of a traditional display panel operate at a high frame rate, the power consumption of the display panel is relatively high. At this time, for a partition that does not need to refresh the screen frequently, a high frame rate is a waste of power. When all display areas (all partitions) of a traditional display panel operates at a low frame rate, although the power consumption of the display panel is low, the refresh rate (frame rate) is too low for a partition that needs to refresh images frequently.

SUMMARY

The disclosure provides a display apparatus and a control device and a control method thereof, so that different display areas (partitions) in the same display panel have different frame rates (refresh rates) adaptively.

In an embodiment of the disclosure, the control device includes a controller. The controller is configured to control a gate driver of a display panel. The gate driver is configured to drive multiple scan lines of the display panel. The controller selects at least one first selected frame and at least one second selected frame in each frame group. An adjacent position between a first partition and a second partition of the display panel corresponds to a corresponding time point in each frame of the at least one first selected frame and a corresponding time point in each frame of the at least one second selected frame. The controller transmits a reset pulse to the gate driver at the corresponding time point in each frame of the at least one second selected frame to clear a scanning pulse in the gate driver. The controller cancels the reset pulse at the corresponding time point in each frame of the at least one first selected frame.

In an embodiment of the disclosure, the control method is described below. At least one first selected frame and at least one second selected frame are selected in each frame group, wherein an adjacent position between a first partition and a second partition of a display panel corresponds to a corresponding time point in each frame of the at least one first selected frame and a corresponding time point in each frame of the at least one second selected frame. A reset pulse is transmitted to a gate driver of the display panel at the corresponding time point in each frame of the at least one second selected frame by a controller to clear a scanning pulse in the gate driver. The reset pulse is cancelled at the corresponding time point in each frame of the at least one first selected frame.

In an embodiment of the disclosure, the display apparatus includes a display panel, a first gate driver, and a control device. The first gate driver is coupled to multiple first scan lines of the display panel. The first gate driver is configured to drive the first scan lines. The control device is coupled to the first gate driver. The control device selects at least one first selected frame and at least one second selected frame in each frame group. An adjacent position between a first partition and a second partition of the display panel corresponds to a corresponding time point in each frame of the at least one first selected frame and a corresponding time point in each frame of the at least one second selected frame. The control device transmits a reset pulse to the first gate driver at the corresponding time point in each frame of the at least one second selected frame to clear a first scanning pulse in the first gate driver. The control device cancels the reset pulse at the corresponding time point in each frame of the at least one first selected frame.

Based on the above, the control device of the embodiments of the disclosure may transmit a reset pulse to the gate driver at the corresponding time point (corresponding to an adjacent position between a first partition and a second partition of the display panel) in each second selected frame of the display frame streaming. After the reset pulse occurs, the scanning pulse in the gate driver has been cleared, so that the gate driver does not scan the scan lines in the second partition (low frame rate area) of the display panel. Thus, the second display area (second partition) of the display panel are not refreshed in each second selected frame, so that the frame rate (refresh rate) of the second display area of the display panel may be different from the first display area (first partition) of the display panel. Based on the control of the control device on the gate driver, the display apparatus may adapt different display partitions in the same display panel to have different frame rates (refresh rates).

In order to make the above-mentioned features and advantages of the disclosure comprehensible, embodiments accompanied with drawings are described in detail below.

DESCRIPTION OF THE EMBODIMENTS

Figure 1:
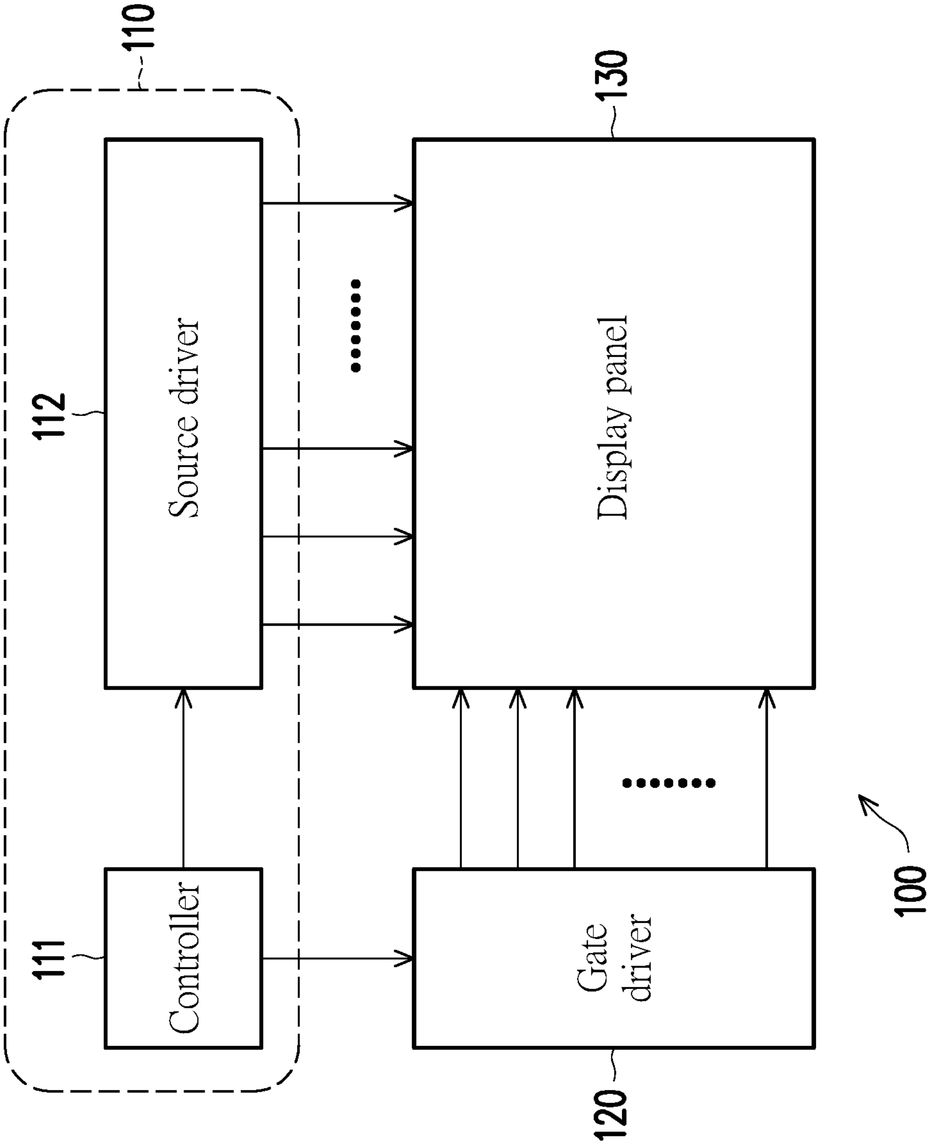
FIG. 1 is a circuit block schematic view of a display apparatus according to an embodiment of the disclosure.

The term "coupled (or connected)" as used throughout this specification (including the scope of the application) may refer to any direct or indirect means of connection. For example, if it is described in the specification that a first device is coupled (or connected) to a second device, it should be construed that the first device can be directly connected to the second device, or the first device can be indirectly connected to the second device through another device or some type of connecting means. Terms "first," "second" and the like mentioned in the full text (including the scope of the patent application) of the description of this application are used only to name the elements or to distinguish different embodiments or scopes and are not intended to limit the upper or lower limit of the number of the elements, nor is it intended to limit the order of the elements. In addition, wherever possible, elements/components/steps with the same reference numerals in the drawings and embodiments represent the same or similar parts. Elements/components/steps that use the same reference numerals or use the same terminology in different embodiments may refer to relevant descriptions of each other.

FIG. 1 is a circuit block schematic view of a display apparatus 100 according to an embodiment of the disclosure. The display apparatus 100 shown in FIG. 1 includes a control device 110, a gate driver 120, and a display panel 130. Based on actual design, the display panel 130 may include various types of display panels, such as liquid-crystal display (LCD) panels or other display panels. The control device 110 is coupled to multiple data lines (also known as source lines) of the display panel 130. The control device 110 may be used as a driver (such as a source driver) to drive multiple data lines of the display panel 130.

The control device 110 is coupled to the gate driver 120. The gate driver 120 is coupled to multiple scan lines (also known as gate lines) of the display panel 130. The gate driver 120 may scan multiple scan lines of the display panel 130. According to actual design, the gate driver 120 may include a gate driver on array (GOA) or other gate driving circuits. In accordance with the scanning time sequence of the gate driver 120 on the display panel 130, the control device 110 may drive multiple data lines of the display panel 130 to enable the display panel 130 to show image.

In some practical application scenarios, the display panel 130 shown in FIG. 1 may not be partitioned. In such an application scenario, the control device 110 shown in FIG. 1 may transmit a reset pulse (native reset pulse) to the gate driver 120 at the beginning of each frame (or at the end of each frame). This clears a scanning pulse of the gate driver 120 before scanning the display panel 130, effectively resetting the scanning pulse that is latched inside the gate driver 120. After the native reset pulse occurs, the gate driver 120 may start scanning the scan lines of the display panel 130 based on a vertical start pulse (scanning pulse) provided by the control device 110, so that all of the display panel 130 may be refreshed.

In other practical application scenarios, the display panel 130 shown in FIG. 1 may be divided into two (or more) partitions. Based on the control of the control device 110 on the gate driver 120, different display areas (different partitions) in the same display panel 130 may have different frame rates (refresh rates). For example (but not limited thereto), it is assumed that the display panel 130 shown in FIG. 1 includes 1612 scan lines. Based on actual operational scenario, it is assumed that the control device 110 dynamically defines a first partition as the first to 540th scan lines (the upper 540 scan lines on the display panel 130), and defines a second partition as the 541st to 1612th scan lines (the lower 1072 scan lines on the display panel 130). Based on the control of the control device 110 on the gate driver 120, the first partition of the display panel 130 has a high frame rate (e.g., 120 Hz), and the second partition of the display panel 130 has a low frame rate (e.g., 60 Hz). Thus, the display apparatus 100 may reduce the refresh rate of the second partition to reduce power consumption while maintaining a high refresh rate of the first partition.

In the application scenario where the display panel 130 is divided into the first partition (high frame rate area) and the second partition (low frame rate area), the control device 110 shown in FIG. 1 may select frames of a first amount (referred to as the first selected frame or normal frame) in each frame group (multiple consecutive frames), and select frames of a second amount (referred to as the second selected frame or rest frame). The frame amount of each frame group may be determined according to actual design and/or actual operation. For example (but not limited thereto), it is assumed that each frame group includes three consecutive frames. In each frame group, the frame amount of "first selected frame" and the frame amount of "second selected frame" may be determined according to actual design and/or actual operation. In some actual operation scenarios, the control device 110 may select all frames in a frame group as "first selected frame". In this case, both the first partition and the second partition of the display panel 130 have the same high frame rate (e.g., 120 Hz). In still some actual operation scenarios, the control device 110 may select one frame in a frame group as "first selected frame", and select the remaining two frames as "second selected frame". In this case, the first partition of the display panel 130 have a high frame rate (e.g., 120 Hz), and the second partition of the display panel 130 have a low frame rate (e.g., 40 Hz). In some other actual operation scenarios, the control device 110 may select two frames in a frame group as "first selected frame", and select the remaining one frame as "second selected frame". In this case, the first partition of the display panel 130 have a high frame rate (e.g., 120 Hz), and the second partition of the display panel 130 have a low frame rate (e.g., 80 Hz).

The control device 110 may selectively transmit a reset pulse to the gate driver 120 in the first selected frame and the second selected frame to clear the scanning pulse that is latched inside the gate driver 120. Based on actual design, in some embodiments, a number of reset pulses in each first selected frame is less than a number of reset pulses in each second selected frame. For example, in some embodiments, the number of reset pulses in each first selected frame is 0, and the number of reset pulses in each second selected frame is 1. In some other embodiments, the number of reset pulses in each first selected frame is 1, and the number of reset pulses in each second selected frame is 2. An adjacent position between the first partition and the second partition of the display panel 130 corresponds to a corresponding time point in each first selected frame and a corresponding time point in each second selected frame. The control device 110 transmits a reset pulse to the gate driver 120 at the corresponding time point in each second selected frame to clear a scanning pulse in the gate driver 120. The control device 110 cancels the reset pulse at the corresponding time point in each first selected frame.

For example, in each first selected frame, the control device 110 transmits a single reset pulse (native reset pulse) to the gate driver 120 only at the beginning of the frame (or the end of the frame) to clear the scanning pulse that is latched inside the gate driver 120. In each second selected frame, the control device 110 transmits multiple reset pulses (e.g., native reset pulse and extra reset pulse) to the gate driver 120 in each second selected frame to clear the scanning pulse that is latched inside the gate driver 120. For example, in each second selected frame, the control device 110 transmits a native reset pulse to the gate driver 120 except at the beginning of the frame (or the end of the frame), the control device 110 further transmits another reset pulse (extra reset pulse) to the gate driver 120 at other time points of the frame. It is assumed that the upper 540 scan lines of the display panel 130 are the first partition (high frame rate area), and the lower 1072 scan lines of the display panel 130 are the second partition (low frame rate area). In each second selected frame, the control device 110 further transmits an extra reset pulse to the gate driver 120 in response to the 540th scan line finishing scanning. Thus, the second partition (low frame rate area) is not scanned in the second selected frames, so that the first partition and the second partition in the same display panel 130 adaptively have different frame rates (refresh rates).

In the embodiment shown in FIG. 1, the control device 110 includes a controller 111 and a source driver 112. The source driver 112 is coupled to multiple data lines of the display panel 130. The controller 111 is coupled to the source driver 112 and the gate driver 120. The controller 111 controls the gate driver 120 of the display panel 130. The gate driver 120 is configured to drive multiple scan lines of the display panel 130. According to different design requirements, in some embodiments, the implementation of the control device 110 and (or) the controller 111 may be a hardware circuit. In other embodiments, the control device 110 and (or) the controller 111 may be implemented in firmware, software (i.e., program), or a combination of the two. In yet another embodiment, the control device 110 and (or) the controller 111 may be implemented in a combination of hardware, firmware, and software.

In terms of hardware, the above control device 110 and (or) the controller 111 may be implemented in a logic circuit on an integrated circuit. For example, related functions of the control device 110 and (or) the controller 111 may be implemented in one or more controllers, microcontrollers, microprocessors, application-specific integrated circuits (ASIC), digital signal processor (DSP), field programmable gate array (FPGA), central processing unit (CPU), and/or various logic blocks, modules, and circuits in other processing units. The related functions of the control device 110 and (or) the controller 111 may be implemented as a hardware circuit by using hardware description languages (e.g., Verilog HDL or VHDL) or other suitable programming languages, such as various logic blocks, modules, and circuits in the integrated circuit.

In terms of software and/or firmware, the related functions of the above control device 110 and (or) controller 111 may be implemented as programming codes. For example, the control device 110 and (or) the controller 111 are implemented by using general programming languages (e.g., C, C++, or assembly language) or other suitable programming languages. The programming codes may be recorded/stored in a "non-transitory machine-readable storage medium". In some embodiments, the non-transitory machine-readable storage medium includes, for example, a semiconductor memory and (or) a storage device. The semiconductor memory includes a memory card, a read only memory (ROM), a flash memory, a programmable logic circuit, or other semiconductor memories. The storage device includes a tape, a disk, a hard disk drive (HDD), a solid-state drive (SSD), or other storage devices. Electronic apparatus (e.g., computer, CPU, controller, microcontroller, or microprocessor) may read and execute the programming codes from the non-transitory machine-readable storage medium, so as to implement the related functions of the control device 110 and (or) the controller 111.

Figure 2:
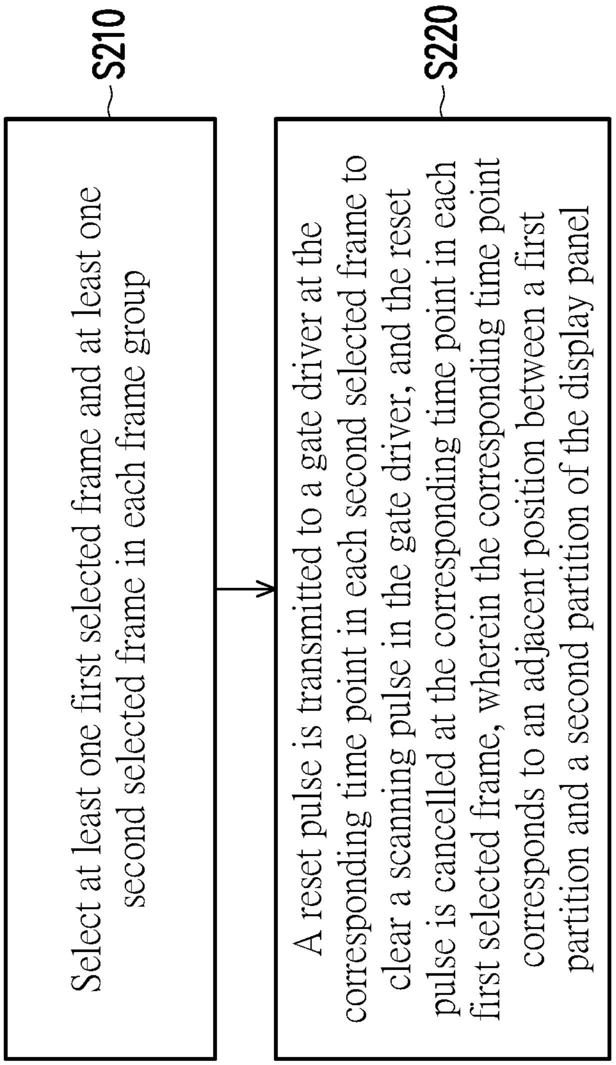
FIG. 2 is a flowchart of a control method according to an embodiment of the disclosure.

FIG. 2 is a flowchart of a control method according to an embodiment of the disclosure. Referring to FIG. 1 and FIG. 2, the controller 111 selects at least one first selected frame and at least one second selected frame in each frame group (step S210). An adjacent position between a first partition and a second partition of the display panel 130 corresponds to a corresponding time point in each first selected frame and a corresponding time point in each second selected frame. The controller 111 transmits a reset pulse to the gate driver 120 at the corresponding time point in each second selected frame to clear a scanning pulse in the gate driver 120 (step S220). The controller 111 cancels the reset pulse at the corresponding time point in each one first selected frame (step S220).

Based on actual design, in some embodiments, a number of reset pulses in each first selected frame is less than a number of reset pulses in each second selected frame. For example, in some embodiments, the number of reset pulses in each first selected frame is 0, and the number of reset pulses in each second selected frame is 1. In some other embodiments, the number of reset pulses in each first selected frame is 1, and the number of reset pulses in each second selected frame is 2.

For example, the controller 111 transmits a single reset pulse (native reset pulse) to the gate driver 120 in each first selected frame to clear the scanning pulse that is latched inside the gate driver 120. For example, the controller 111 transmits the single reset pulse (native reset pulse) to the gate driver 120 in a start period (or an end period) of each first selected frame. After the native reset pulse occurs, the gate driver 120 may start scanning the scan lines of the display panel 130 based on a vertical start pulse provided by the control device 110, so that all partitions of the display panel 130 may be refreshed in each first selected frame.

The controller 111 transmits multiple reset pulses to the gate driver 120 in each second selected frame (step S220), so as to clear the scanning pulse that is latched inside the gate driver 120 at different time points in each second selected frame. For example, the controller 111 transmits a native reset pulse to the gate driver 120 at a first time point in each second selected frame, and the controller 111 further transmits an extra reset pulse to the gate driver 120 at a second time point (different from the first time point) in each second selected frame. For example, the first time point is in the start period or the end period of each second selected frame, and the second time point is outside the start period and end period (e.g., between the start period and the end period). The second time point is defined as a corresponding time point in each first selected frame corresponding to an adjacent position between the first partition (high frame rate area) and the second partition (low frame rate area) of the display panel 130 and a corresponding time point in each second selected frame corresponding to the adjacent position between the first partition and the second partition of the display panel 130.

To sum up, the control device 110 of this embodiment may transmit a single reset pulse (native reset pulse) to the gate driver 120 in each first selected frame of the display frame streaming to refresh all display areas (all partitions) of the display panel 130. In each second selected frame of the display frame streaming, the control device 110 may transmit multiple reset pulses (e.g., native reset pulse and extra reset pulse) to the gate driver 120. In each second selected frame, after the native reset pulse occurs, the gate driver 120 may start scanning the scan lines of the display panel 130 based on the vertical start pulse (scanning pulse) provided by the control device 110. Thus, the first partition (high frame rate area) of the display panel 130 may be refreshed in each second selected frame. After the extra reset pulse occurs, the scanning pulse in the gate driver 120 has been cleared, so that the gate driver 120 does not scan the scan lines in the second partition (low frame rate area) of the display panel 130. Thus, based on the extra reset pulse, the second partition of the display panel 130 are not refreshed in each second selected frame, so that the frame rate (refresh rate) of the second partition of the display panel 130 may be different from the first partition of the display panel 130. Based on the control of the control device 110 on the gate driver 120, the display apparatus 100 may adapt different display partitions in the same display panel 130 to have different frame rates (refresh rates).

Figure 3:
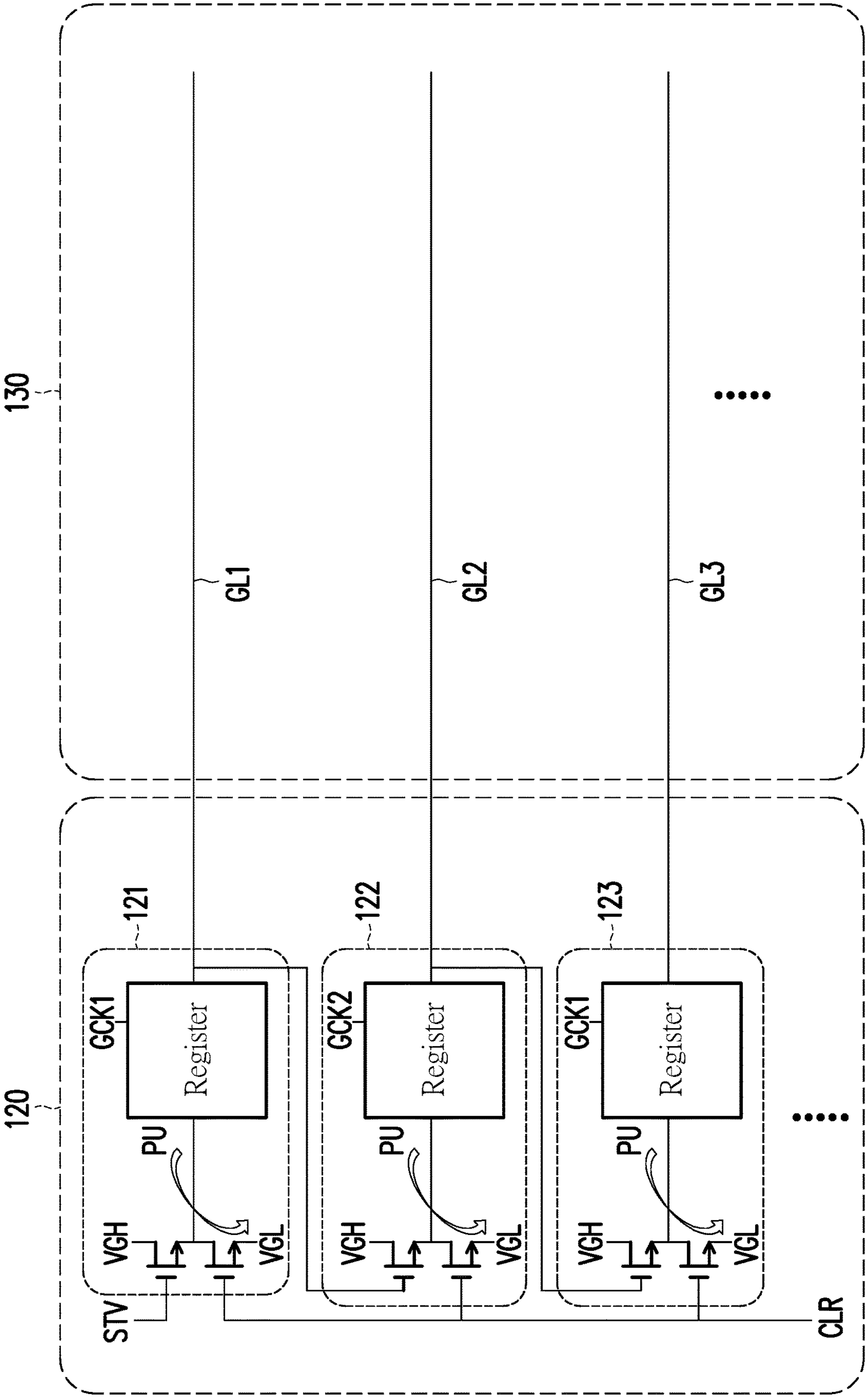
FIG. 3 is a circuit block schematic view of a gate driver according to an embodiment of the disclosure.

FIG. 3 is a circuit block schematic view of a gate driver 120 according to an embodiment of the disclosure. In the embodiment shown in FIG. 3, the gate driver 120 includes multiple shift registers, such as shift registers 121, 122, and 123 shown in FIG. 3. Each of the shift registers 121, 122, and 123 is coupled to a corresponding scan line of the display panel 130, such as scan lines GL1, GL2, and GL3 shown in FIG. 3. These shift registers 121~123 shown in FIG. 3 are triggered by gate clock signals GCK1 and GCK2, so as to transmit a vertical start pulse STV (scanning pulse) stepwise. Voltage VGH and VGL shown in FIG. 3 are power voltage and reference voltage (high voltage and low voltage) respectively. The control device 110 transmits a reset pulse CLR (native reset pulse) to each of the shift registers of the gate driver 120 at the beginning (or the end of the frame) of each second selected frame. The control device 110 further transmits another reset pulse CLR (extra reset pulse) to each of the shift registers at other time points in each second selected frame. Based on an extra reset pulse CLR, the content that is latched in the entire string of shift registers 121~123 is pulled down to the reference voltage VGL (i.e., the scanning pulse that is latched in the gate driver 120 is cleared), so that the entire string of shift registers 121~123 are unable to continue to transmit the scanning pulse (vertical start pulse STV).

According to actual design, the control device 110 may issue the extra reset pulse CLR to each of the shift registers 121~123 in each second selected frame, and (or) stop supplying the gate clock signal GCK (such as GCK1 and GCK2 shown in FIG. 3) during a certain period within each second selected frame. By stopping the toggling behavior of the gate clock signal GCK (such as GCK1 and GCK2 shown in FIG. 3), and/or by applying multiple reset pulses CLR in the same frame, the gate driver 120 stops scanning the display panel 130 after the high frame rate area (first partition) of the display panel 130 is refreshed.

In this application, the stopping position of data refresh may be dynamically adjusted, and the range of the high frame rate area may be flexibly changed. For example, by stopping the toggling behavior of the gate clock signal GCK in the low frame rate area (second partition), the voltage (latched content) of a node PU of each of the shift registers 121~123 is pulled down to close to the reference voltage VGL due to electric leakage (i.e., the scanning pulse that is latched in the gate driver 120 is cleared), so that the stepwise transmission (scanning) of these shift registers 121~123 of the gate driver 120 is stopped. Since the supply of the gate clock signals GCK1 and GCK2 to the gate driver 120 is stopped, the second partition (low frame rate area) of the display panel 130 is not refreshed in each second selected frame, so that the frame rate (refresh rate) of the second partition of the display panel 130 may be different from the first partition of the display panel 130. Thus, the display apparatus 100 may adapt different display partitions in the same display panel 130 to have different frame rates (refresh rates).

Alternatively, the control device 110 may use the extra reset pulse CLR in the low frame rate area (second partition) to enable the voltage (latch content) of the node PU of each of the shift registers 121~123 to be quickly pulled down to close to the reference voltage VGL (i.e., the scanning pulse that is latched in the gate driver 120 is cleared), so that the stepwise transmission (scanning) of the gate driver 120 is stopped. Since the extra reset pulse CLR is applied, the second partition (low frame rate area) of the display panel 130 is not refreshed in each second selected frame, so that the frame rate (refresh rate) of the second partition of the display panel 130 may be different from that of the first partition of the display panel 130. Thus, the display apparatus 100 may adapt different display partitions in the same display panel 130 to have different frame rates (refresh rates).

The source driver 112 of the control device 110 may drive multiple data lines of the display panel 130 based on the control of the controller 111. In some embodiments, the controller 111 enables the source driver 112 before the second time point in each second selected frame in accordance with the scanning time sequence of the gate driver 120 on the display panel 130. In addition, the controller 111 disables an analog domain circuit and (or) a digital domain circuit of the source driver 112 after the second time point in each second selected frame. For example, the source driver 112 may stop or reduce the source voltage variation behavior (such as maintaining a DC level, Hi-Z state, or other means) in the second partition (low frame rate area) to save power.

The controller 111 may dynamically adjust the stopping position of the gate clock signal, and (or) dynamically determine the time sequence of the extra reset pulse, so that the shift register of the gate driver 120 stops the stepwise transmission at a certain target time point. Thus, in the second selected frame, only the pixel data of the high frame rate area (first partition) of the display panel 130 is refreshed, while the pixel data of the low frame rate area (second partition) of the display panel 130 remains unchanged (not refreshed).

Figure 4:
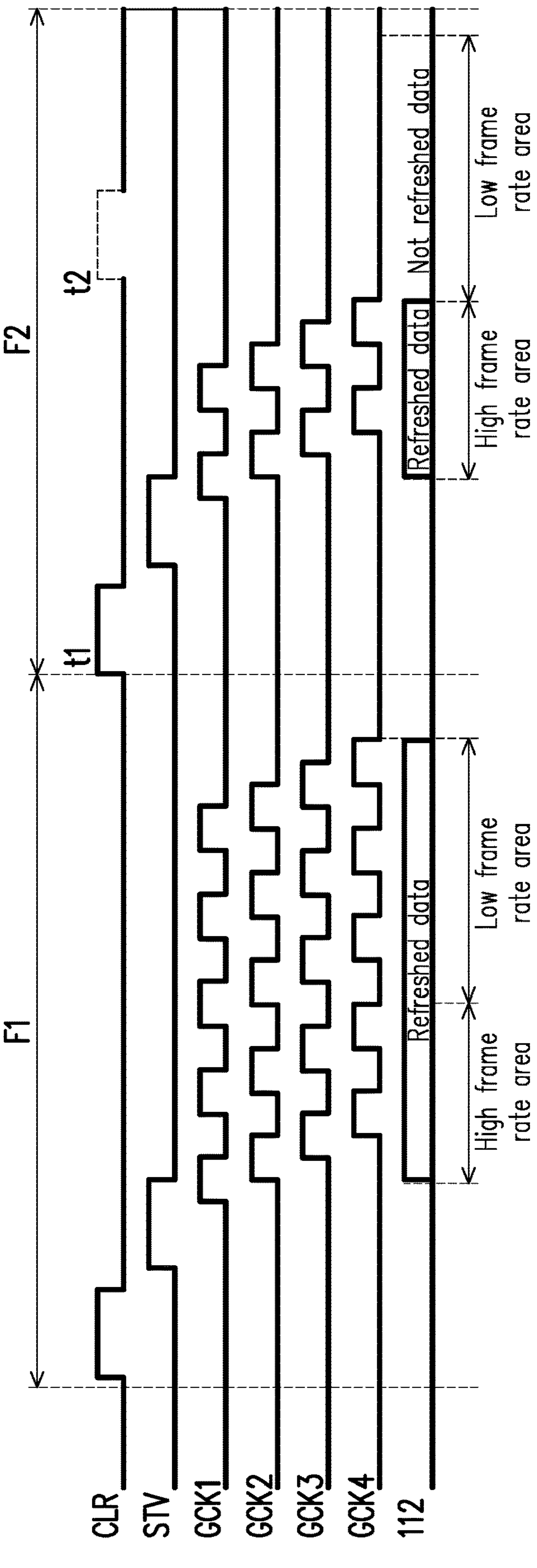
FIG. 4 is a signal time sequence schematic view of a gate driver according to an embodiment of the disclosure.

FIG. 4 is a signal time sequence schematic view of a gate driver 120 according to an embodiment of the disclosure. The horizontal axis in FIG. 4 represents time. The vertical start pulse STV and the shift register may not be limited to one group. The gate clock signals GCK1, GCK2, GCK3, and GCK4 shown in FIG. 4 are used to trigger multiple shift registers of the gate driver 120. The frame period F1 shown on the left side of FIG. 4 is the first selected frame (normal frame). In the frame period F1, the reset pulse CLR first clears the scanning pulse (vertical start pulse) of all shift registers of the gate driver 120, and then the control device 110 may provide the vertical start pulse STV and the gate clock signals GCK1~GCK4 to the gate driver 120. Based on the vertical start pulse STV and the gate clock signals GCK1~GCK4, the gate driver 120 and the source driver 112 may completely refresh the high frame rate area (first partition) and the low frame rate area (second partition). Thus, in the frame period F1, all display areas (all partitions) of the display panel 130 may be refreshed normally.

The frame period F2 shown on the right side of FIG. 4 is the second selected frame (rest frame). In the frame period F2, the gate driver 120 partially scans the high frame rate area (first partition), but does not scan the low frame rate area (second partition). The controller 111 transmits the native reset pulse CLR to the gate driver 120 at a first time point t1 in the frame period F2, and the controller 111 further transmits the extra reset pulse CLR to the gate driver 120 at a second time point t2 (the corresponding time point corresponding to an adjacent position between the first partition and the second partition of the display panel 130) in the frame period F2, so as to clear the charge of the node PU of all shift registers of the gate driver 120. Thus, the scanning pulse transmission of all shift registers of the gate driver 120 is stopped, so that the low frame rate area (second partition) is not refreshed in the frame period F2. In the frame period F2, the controller 111 continuously supplies the gate clock signals GCK1~GCK4 to the gate driver 120 before the second time point t2. In accordance with the operation time sequence of the gate driver 120, the source driver 112 may refresh the high frame rate area (first partition) before the second time point t2. After the second time point t2 (after the gate driver 120 refreshes the high frame rate area), the controller 111 stops supplying the gate clock signals GCK1~GCK4 to the gate driver 120. In accordance with the operation time sequence of the gate driver 120, the source driver 112 may stop refreshing the pixel data of the low frame rate area (second partition) after the second time point t2. For example, in response to the shift registers of the gate driver 120 stopping the stepwise transmission, the source driver 112 may maintain a black grayscale voltage (or other DC levels) for the data lines of the display panel 130, maintain a Hi-Z state for the data lines, or reduce the change frequency of the data lines. Alternatively, a digital data route (digital domain circuit) inside the source driver 112 may enter a power saving mode.

Figure 5:
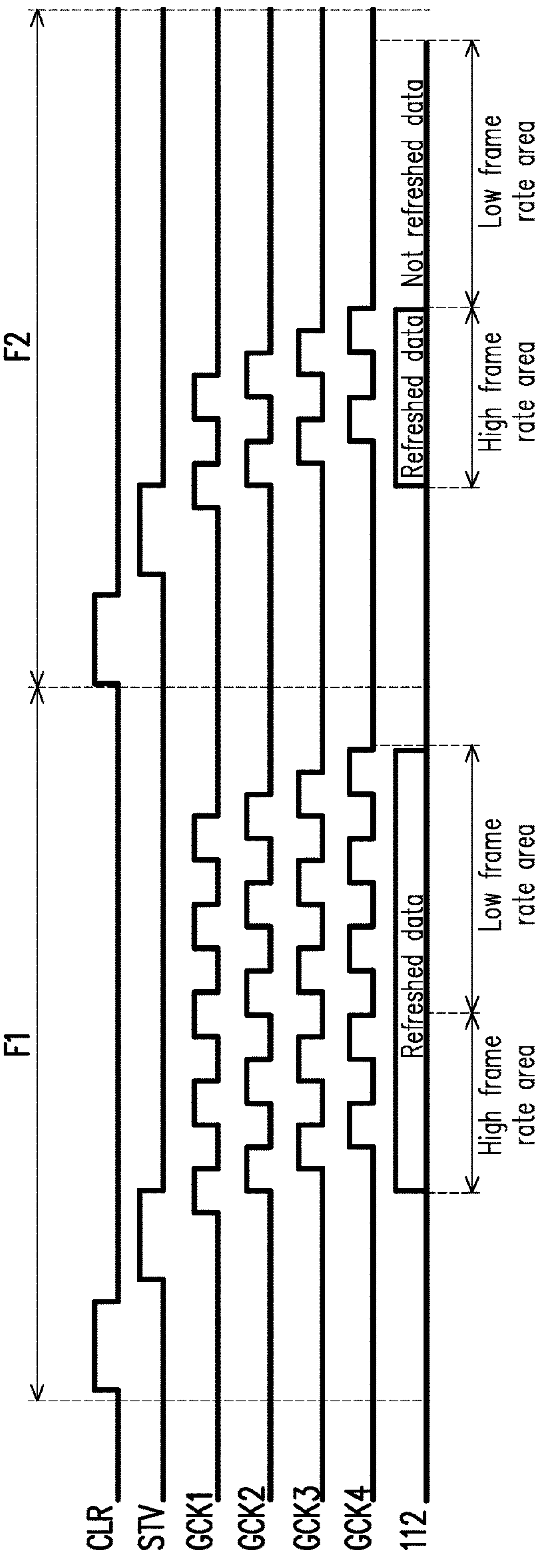
FIG. 5 is a signal time sequence schematic view of a gate driver according to another embodiment of the disclosure.

FIG. 5 is a signal time sequence schematic view of a gate driver 120 according to another embodiment of the disclosure. The horizontal axis in FIG. 5 represents time. The frame period F1 shown on the left side of FIG. 5 is the first selected frame (normal frame). In the frame period F1, all display areas (all partitions) of the display panel 130 are refreshed normally. The frame period F2 shown on the right side of FIG. 5 is the second selected frame (rest frame). In the frame period F2, the gate driver 120 only partially scans the high frame rate area (first partition) of the display panel 130. After the gate driver 120 refreshes the high frame rate area, the controller 111 may stop the toggling behavior of the gate clock signals GCK1~GCK4. That is, the controller 111 stops supplying the gate clock signals GCK1~GCK4 to the gate driver 120, so that all shift registers of the gate driver 120 stop the stepwise transmission. During the period when these shift registers stop the stepwise transmission, the voltage of the node PU of these shift registers drops due to electric leakage (the scanning pulse that is latched in the gate driver 120 is cleared). In response to the reset pulse CLR of the next frame period, the scanning pulse of all shift registers in the gate driver 120 is cleared (resetting the voltage of the node PU). In response to the vertical start pulse STV of the next frame period, the source driver 112 and the gate driver 120 may refresh the image from the beginning. In response to the shift registers of the gate driver 120 stopping the stepwise transmission, the source driver 112 may maintain a black grayscale voltage (or other DC levels) for the data lines of the display panel 130, maintain a Hi-Z state for the data lines, or reduce the change frequency of the data lines. Alternatively, a digital data route (digital domain circuit) inside the source driver 112 may enter a power saving mode.

Figure 6:
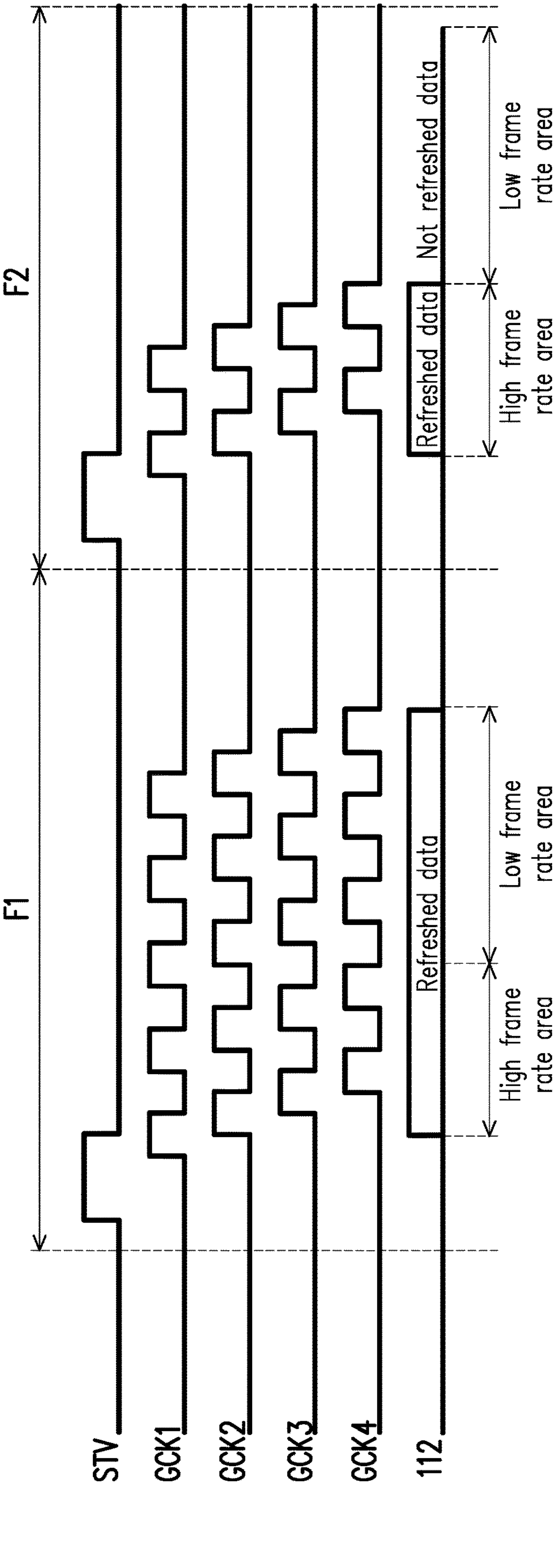
FIG. 6 is a signal time sequence schematic view of a gate driver according to yet another embodiment of the disclosure.

FIG. 6 is a signal time sequence schematic view of a gate driver 120 according to yet another embodiment of the disclosure. The horizontal axis in FIG. 6 represents time. The frame period F1 shown on the left side of FIG. 6 is the first selected frame (normal frame). In the frame period F1, all display areas (all partitions) of the display panel 130 are refreshed normally. The frame period F2 shown on the right side of FIG. 6 is the second selected frame (rest frame). In the frame period F2, the gate driver 120 only partially scans the high frame rate area (first partition) of the display panel 130. After the gate driver 120 refreshes the high frame rate area, the controller 111 may stop the toggling behavior of the gate clock signals GCK1~GCK4, so that all shift registers of the gate driver 120 stop the stepwise transmission. During the period when these shift registers stop the stepwise transmission, the voltage of the node PU of these shift registers drops due to electric leakage, and then the scanning pulse that is latched in the gate driver 120 disappears (the scanning pulse is cleared). In response to the vertical start pulse STV of the next frame period, the source driver 112 and the gate driver 120 may refresh the image from the beginning. In response to the shift registers of the gate driver 120 stopping the stepwise transmission, the source driver 112 may maintain a black grayscale voltage (or other DC levels) for the data lines of the display panel 130, maintain a Hi-Z state for the data lines, or reduce the change frequency of the data lines. Alternatively, a digital data route (digital domain circuit) inside the source driver 112 may enter a power saving mode.

Figure 7:
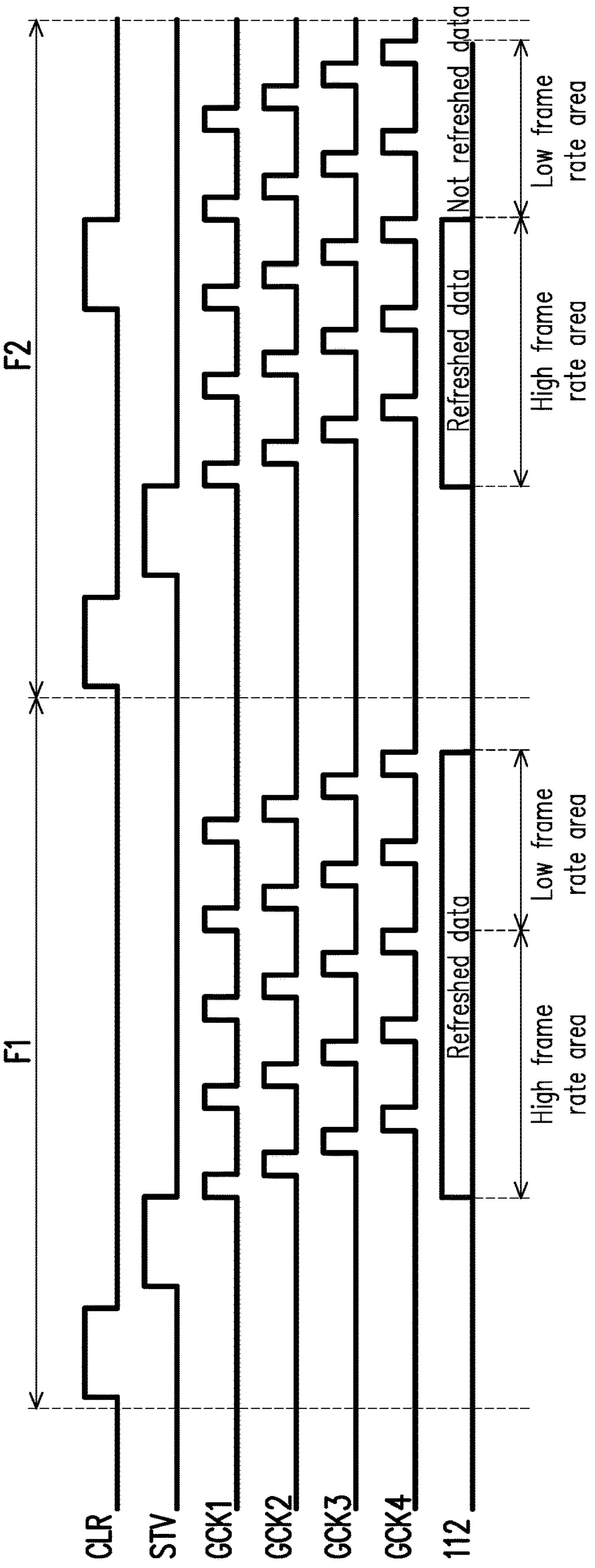
FIG. 7 is a signal time sequence schematic view of a gate driver according to still another embodiment of the disclosure.

FIG. 7 is a signal time sequence schematic view of a gate driver 120 according to still another embodiment of the disclosure. The horizontal axis in FIG. 7 represents time. The frame period F1 shown on the left side of FIG. 7 is the first selected frame (normal frame). In the frame period F1, all display areas (all partitions) of the display panel 130 are refreshed normally. The frame period F2 shown on the right side of FIG. 7 is the second selected frame (rest frame). In the frame period F2, the gate driver 120 only partially scans the high frame rate area (first partition) of the display panel 130. After the gate driver 120 refreshes the high frame rate area, the controller 111 does not stop the toggling behavior of the gate clock signal GCK. That is, in the frame period F2, the controller 111 continuously supplies the gate clock signals GCK1~GCK4 to the gate driver 120 after the second time point. In addition to the native reset pulse CLR, the controller 111 transmits the extra reset pulse CLR to the gate driver 120 during the frame period F2 to reset all shift registers of the gate driver 120 (the voltage of the node PU of these shift registers are reset). In response to the vertical start pulse STV of the next frame period, the source driver 112 and the gate driver 120 may refresh the image from the beginning. In response to the shift registers of the gate driver 120 stopping the stepwise transmission, the source driver 112 may maintain a black grayscale voltage (or other DC levels) for the data lines of the display panel, maintain a Hi-Z state for the data lines, or reduce the change frequency of the data lines. Alternatively, a digital data route (digital domain circuit) inside the source driver 112 may enter a power saving mode.

Figure 8:
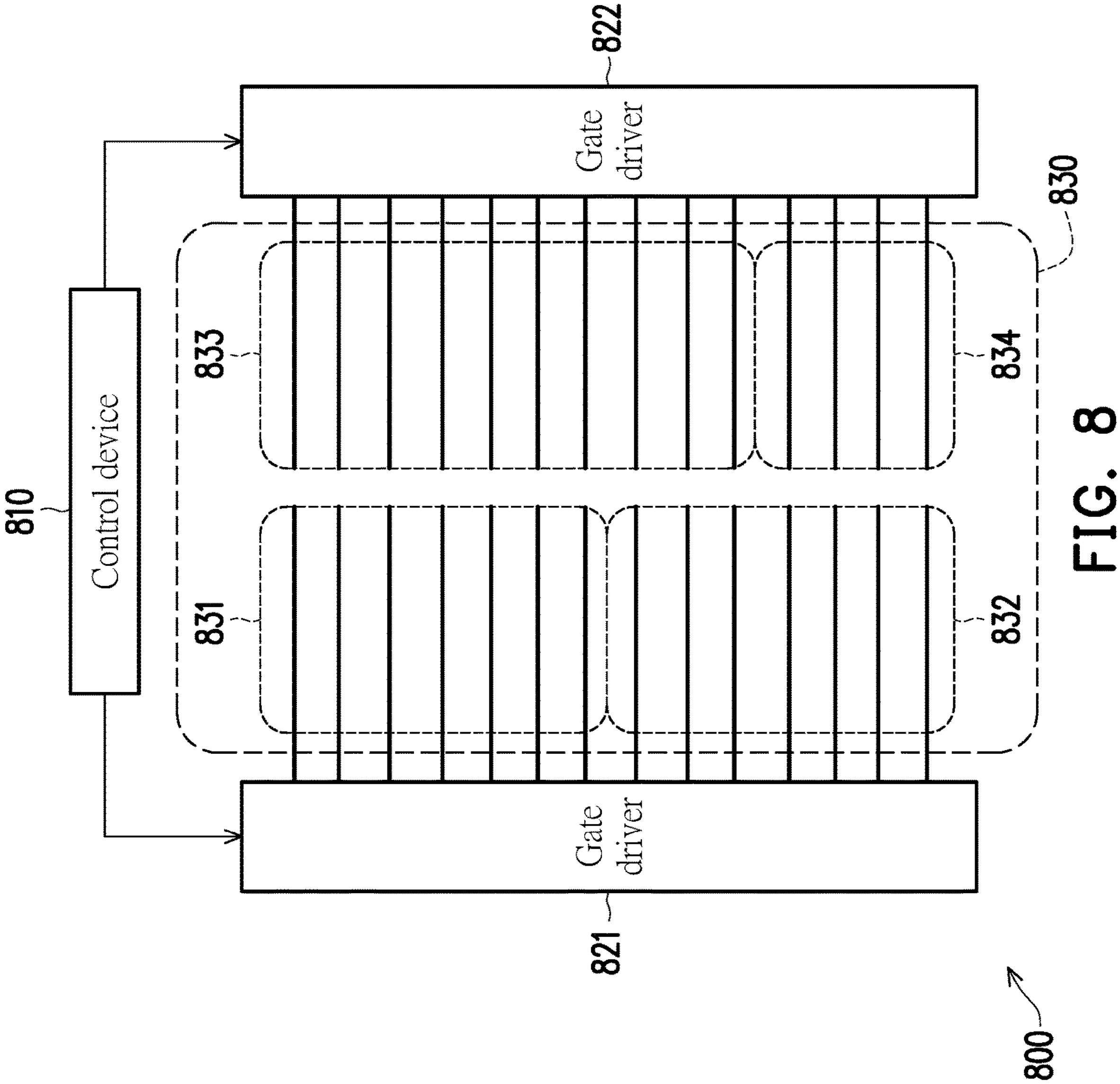
FIG. 8 is a circuit block schematic view of a display apparatus according to another embodiment of the disclosure.

FIG. 8 is a circuit block schematic view of a display apparatus 800 according to another embodiment of the disclosure. The display apparatus 800 shown in FIG. 8 includes a control device 810, a gate driver 821, a gate driver 822, and a display panel 830. The display apparatus 800, the control device 810, and the display panel 830 shown in FIG. 8 may refer to the relevant descriptions of the display apparatus 100, the control device 110, and the display panel 130 shown in FIG. 1 by analogy. For the gate driver 821 and the gate driver 822 shown in FIG. 8, reference may be made to the related description of the gate driver 120 shown in FIG. 1 and by analogy.

In the embodiment shown in FIG. 8, the display panel 830 is divided into a left half and a right half. The scan lines in the left half are not electrically connected to the scan lines in the right half. The gate driver 821 is disposed on the left side of the display panel 830, and the gate driver 822 is arranged on the right side of the display panel 830. The gate driver 821 is coupled to multiple first scan lines of the display panel 830, and the gate driver 822 is coupled to multiple second scan lines of the display panel 830, as shown in FIG. 8. The control device 810 is coupled to the gate drivers 821 and 822. In response to the left and right sides of the display panel 830 using different gate drivers 821 and 822, the gate drivers 821 and 822 may independently perform scanning operations on the display panel 830. The scanning operation performed by any one of the gate drivers 821 and 822 on the display panel 830 may refer to the relevant descriptions in FIG. 3 to FIG. 7 and by analogy, so details are not repeated herein.

The gate driver 821 drives the first scan lines of the display panel 830, and the gate driver 822 drives the second scan lines of the display panel 830. The control device 810 selects the first selected frame of the first amount and the second selected frame of the second amount in each frame group, where the first selected frame is different from the second selected frame. The control device 810 transmits a single reset pulse to the gate driver 821 in each first selected frame to clear the scanning pulse in the gate driver 821. The control device 810 transmits multiple reset pulses to the gate driver 821 in each second selected frame to clear the scanning pulse in the gate driver 821 at different time points. Thus, in each second selected frame, only the pixel data of the high frame rate area 831 (first partition) of the display panel 830 is refreshed, while the pixel data of the low frame rate area 832 (second partition) of the display panel 830 remains unchanged (not refreshed). Based on the control of the control device 810 on the gate driver 821, the high frame rate area 831 of the display panel 830 has a high frame rate (e.g., 120 Hz), and the low frame rate area 832 of the display panel 830 has a low frame rate (e.g., 40 Hz). Thus, the display apparatus 800 may reduce the refresh rate of the low frame rate area 832 to reduce power consumption while maintaining a high refresh rate of the high frame rate area 831.

The control device 810 further selects the third selected frame of the third amount and the fourth selected frame of the fourth amount in each frame group, where the third selected frame is different from the fourth selected frame. The control device 810 transmits a single reset pulse to the gate driver 822 in each third selected frame to clear the scanning pulse in the gate driver 822. The control device 810 transmits multiple reset pulses to the gate driver 822 in each fourth selected frame to clear the scanning pulse in the gate driver 822 at different time points. Thus, in each fourth selected frame, only the pixel data of the high frame rate area 833 (third partition) of the display panel 830 is refreshed, while the pixel data of the low frame rate area 834 (fourth partition) of the display panel 830 remains unchanged (not refreshed). Based on the control of the control device 810 on the gate driver 822, the high frame rate area 833 of the display panel 830 has a high frame rate (e.g., 120 Hz), and the low frame rate area 834 of the display panel 830 has a low frame rate (e.g., 80 Hz). Thus, the display apparatus 800 may reduce the refresh rate of the low frame rate area 834 to reduce power consumption while maintaining a high refresh rate of the high frame rate area 833.

Figure 9:
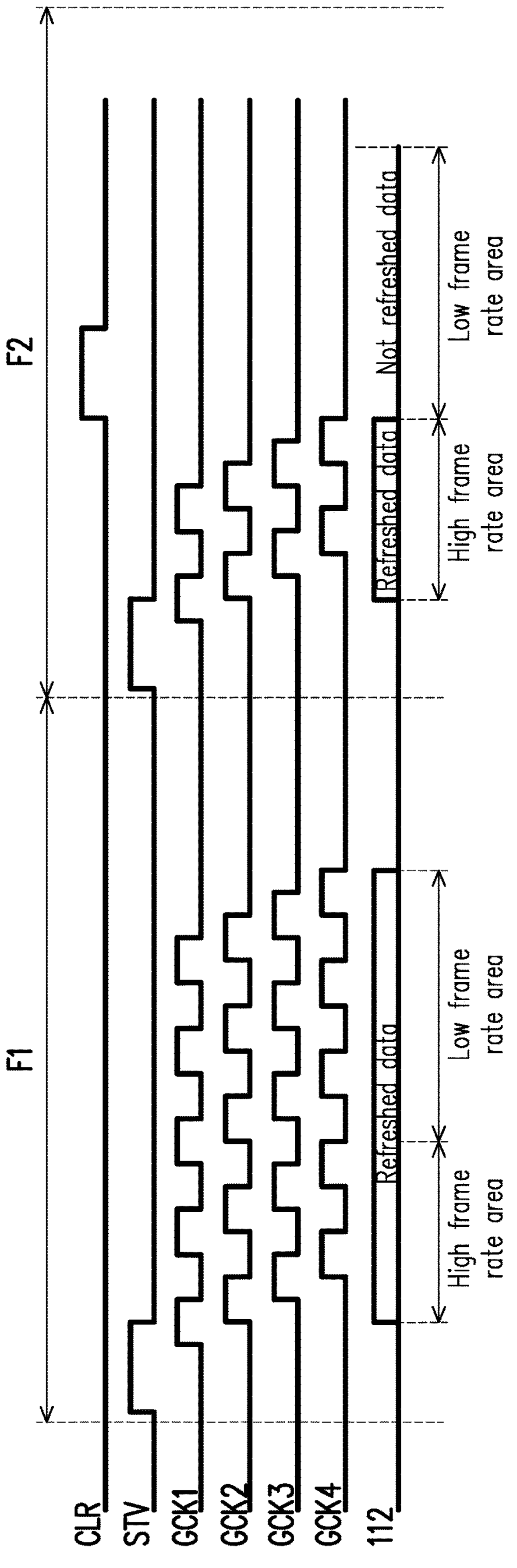
FIG. 9 is a signal time sequence schematic view of a gate driver according to still another embodiment of the disclosure.

FIG. 9 is a signal time sequence schematic view of a gate driver 120 according to still another embodiment of the disclosure. The horizontal axis in FIG. 9 represents time. In embodiment of FIG. 9, the number of reset pulses in each first selected frame is 0, and the number of reset pulses in each second selected frame is 1. The frame period F1 shown on the left side of FIG. 9 is the first selected frame (normal frame). In the frame period F1, without the reset pulse CLR, all display areas (all partitions) of the display panel 130 are refreshed normally. The frame period F2 shown on the right side of FIG. 9 is the second selected frame (rest frame). In the frame period F2, the gate driver 120 only partially scans the high frame rate area (first partition) of the display panel 130. After the gate driver 120 refreshes the high frame rate area in the frame period F2, the controller 111 stops the toggling behavior of the gate clock signal GCK. The controller 111 transmits the reset pulse CLR to the gate driver 120 after the gate driver 120 refreshes the high frame rate area in the frame period F2, so as to reset all shift registers of the gate driver 120 (the voltage of the node PU of these shift registers are reset).

Figure 10:
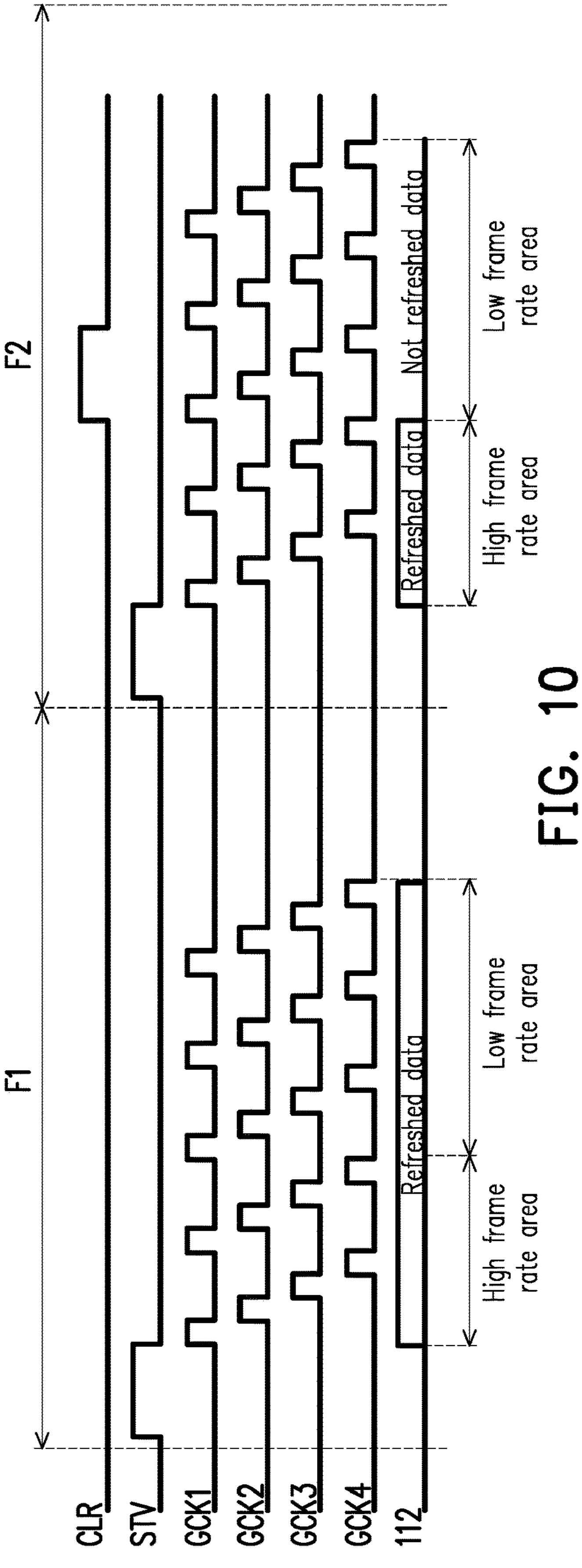
FIG. 10 is a signal time sequence schematic view of a gate driver according to still another embodiment of the disclosure.

FIG. 10 is a signal time sequence schematic view of a gate driver 120 according to still another embodiment of the disclosure. The horizontal axis in FIG. 10 represents time. In embodiment of FIG. 10, the number of reset pulses in each first selected frame is 0, and the number of reset pulses in each second selected frame is 1. The frame period F1 shown on the left side of FIG. 10 is the first selected frame (normal frame). In the frame period F1, without the reset pulse CLR, all display areas (all partitions) of the display panel 130 are refreshed normally. The frame period F2 shown on the right side of FIG. 10 is the second selected frame (rest frame). In the frame period F2, the gate driver 120 only partially scans the high frame rate area (first partition) of the display panel 130. After refreshing the high frame rate area in the frame period F2, the controller 111 does not stop the toggling behavior of the gate clock signal GCK. The controller 111 transmits the reset pulse CLR to the gate driver 120 after refreshing the high frame rate area in the frame period F2, so as to reset all shift registers of the gate driver 120 (the voltage of the node PU of these shift registers are reset).

Although the disclosure has been described in detail with reference to the above embodiments, they are not intended to limit the disclosure. Those skilled in the art should understand that it is possible to make changes and modifications without departing from the spirit and scope of the disclosure. Therefore, the protection scope of the disclosure shall be defined by the following claims.

What is claimed is:

1. A control device, comprising:

a controller, configured to control a gate driver of a display panel, wherein the gate driver is configured to drive a plurality of scan lines of the display panel, the controller selects at least one first selected frame and at least one second selected frame in each frame group, an adjacent position between a first partition and a second partition of the display panel corresponds to a corresponding time point in each frame of the at least one first selected frame and a corresponding time point in each frame of the at least one second selected frame, the controller transmits a reset pulse to the gate driver at the corresponding time point in each frame of the at least one second selected frame to clear a scanning pulse in the gate driver, and the controller cancels the reset pulse at the corresponding time point in each frame of the at least one first selected frame, wherein the controller transmits a single reset pulse to the gate driver in each frame of the at least one first selected frame to clear the scanning pulse in the gate driver, and the controller transmits a plurality of reset pulses to the gate driver in each frame of the at least one second selected frame to clear the scanning pulse in the gate driver at different time points.

2. The control device according to claim 1, wherein the controller transmits the single reset pulse to the gate driver during a start period or an end period in each frame of the at least one first selected frame.

3. The control device according to claim 1, wherein the controller transmits a native reset pulse to the gate driver at a first time point in each frame of the at least one second selected frame, and the controller further transmits an extra reset pulse to the gate driver at the corresponding time point different from the first time point in each frame of the at least one second selected frame.

4. The control device according to claim 3, wherein the first time point is in a start period or an end period in each frame of the at least one second selected frame, and the corresponding time point is outside the start period and the end period.

5. The control device according to claim 3, wherein the controller continuously supplies a gate clock signal to the gate driver after the corresponding time point in each frame of the at least one second selected frame.

6. The control device according to claim 3, wherein the controller stops supplying a gate clock signal to the gate driver after the corresponding time point in each frame of the at least one second selected frame.

7. The control device according to claim 3, further comprising:

a source driver, coupled to the controller, and configured to drive a plurality of data lines of the display panel based on control of the controller, wherein the controller enables the source driver before the corresponding time point in each frame of the at least one second selected frame, and the controller disables an analog domain circuit of the source driver after the corresponding time point in each frame of the at least one second selected frame.

8. The control device according to claim 3, further comprising:

a source driver, coupled to the controller and configured to drive a plurality of data lines of the display panel based on control of the controller, wherein the controller enables the source driver before the corresponding time point in each frame of the at least one second selected frame, and the controller disables a digital domain circuit of the source driver after the corresponding time point in each frame of the at least one second selected frame.

9. A control method, comprising:

selecting at least one first selected frame and at least one second selected frame in each frame group, wherein an adjacent position between a first partition and a second partition of a display panel corresponds to a corresponding time point in each frame of the at least one first selected frame and a corresponding time point in each frame of the at least one second selected frame;

transmitting a reset pulse to a gate driver of the display panel at the corresponding time point in each frame of the at least one second selected frame by a controller to clear a scanning pulse in the gate driver;

transmitting a single reset pulse to the gate driver in each frame of the at least one first selected frame by the controller to clear the scanning pulse in the gate driver, wherein the gate driver is configured to drive a plurality of scan lines of the display panel; and transmitting a plurality of reset pulses to the gate driver in each frame of the at least one second selected frame by the controller to clear the scanning pulse in the gate driver at different time points; and cancelling the reset pulse at the corresponding time point in each frame of the at least one first selected frame.

10. The control method according to claim 9, further comprising:

transmitting the single reset pulse to the gate driver by the controller during a start period or an end period in each frame of the at least one first selected frame.

11. The control method according to claim 9, further comprising:

transmitting a native reset pulse to the gate driver by the controller at a first time point in each frame of the at least one second selected frame, and transmitting an extra reset pulse to the gate driver by the controller at the corresponding time point different from the first time point in each frame of the at least one second selected frame.

12. The control method according to claim 11, wherein the first time point is in a start period or an end period in each frame of the at least one second selected frame, and the corresponding time point is outside the start period and the end period.

13. The control method according to claim 11, further comprising:

continuously supplying a gate clock signal to the gate driver by the controller after the corresponding time point in each frame of the at least one second selected frame.

14. The control method according to claim 11, further comprising:

stop supplying a gate clock signal to the gate driver by the controller after the corresponding time point in each frame of the at least one second selected frame.

15. The control method according to claim 11, further comprising:

enabling a source driver by the controller before the corresponding time point in each frame of the at least one second selected frame, wherein the source driver is configured to drive a plurality of data lines of the display panel based on control of the controller, and disabling an analog domain circuit of the source driver by the controller after the corresponding time point in each frame of the at least one second selected frame.

16. The control method according to claim 11, further comprising:

enabling a source driver by the controller before the corresponding time point in each frame of the at least one second selected frame, wherein the source driver is configured to drive a plurality of data lines of the display panel based on control of the controller, and disabling a digital domain circuit of the source driver by the controller after the corresponding time point in each frame of the at least one second selected frame.

17. A display apparatus, comprising:

a display panel;

a first gate driver, coupled to a plurality of first scan lines of the display panel, wherein the first gate driver is configured to drive the first scan lines; and a control device, coupled to the first gate driver, wherein the control device selects at least one first selected frame and at least one second selected frame in each frame group, an adjacent position between a first partition and a second partition of the display panel corresponds to a corresponding time point in each frame of the at least one first selected frame and a corresponding time point in each frame of the at least one second selected frame, the control device transmits a reset pulse to the first gate driver at the corresponding time point in each frame of the at least one second selected frame to clear a first scanning pulse in the first gate driver, and the control device cancels the reset pulse at the corresponding time point in each frame of the at least one first selected frame, wherein the control device transmits a single reset pulse to the first gate driver in each frame of the at least one first selected frame to clear the first scanning pulse in the first gate driver, and the control device transmits a plurality of reset pulses to the first gate driver in each frame of the at least one second selected frame to clear the first scanning pulse in the first gate driver at different time points.

18. The display apparatus according to claim 17, wherein the control device comprises:

a controller, configured to control the first gate driver, wherein the controller transmits the single reset pulse to the first gate driver in each frame of the at least one first selected frame to clear the first scanning pulse in the first gate driver, and the controller transmits the plurality of reset pulses to the first gate driver in each frame of the at least one second selected frame to clear the first scanning pulse in the first gate driver at the different time points.

19. The display apparatus according to claim 18, wherein the controller transmits the single reset pulse to the first gate driver during a start period or an end period in each frame of the at least one first selected frame.

20. The display apparatus according to claim 18, wherein the controller transmits a native reset pulse to the first gate driver at a first time point in each frame of the at least one second selected frame, and the controller further transmits an extra reset pulse to the first gate driver at the corresponding time point different from the first time point in each frame of the at least one second selected frame.

21. The display apparatus according to claim 20, wherein the first time point is in a start period or an end period in each frame of the at least one second selected frame, and the corresponding time point is outside the start period and the end period.

22. The display apparatus according to claim 20, wherein the controller continuously supplies a gate clock signal to the first gate driver after the corresponding time point in each frame of the at least one second selected frame.

23. The display apparatus according to claim 20, wherein the controller stops supplying a gate clock signal to the first gate driver after the corresponding time point in each frame of the at least one second selected frame.

24. The display apparatus according to claim 20, comprising:

a source driver, coupled to the controller, and configured to drive a plurality of data lines of the display panel based on control of the controller, wherein the controller enables the source driver before the corresponding time point in each frame of the at least one second selected frame, and the controller disables an analog domain circuit of the source driver after the corresponding time point in each frame of the at least one second selected frame.

25. The display apparatus according to claim 20, comprising:

a source driver, coupled to the controller, and configured to drive a plurality of data lines of the display panel based on control of the controller, wherein the controller enables the source driver before the corresponding time point in each frame of the at least one second selected frame, and the controller disables a digital domain circuit of the source driver after the corresponding time point in each frame of the at least one second selected frame.

26. The display apparatus according to claim 17, further comprising:

a second gate driver, coupled to a plurality of second scan lines of the display panel, wherein the second gate driver is configured to drive the second scan lines, the control device is coupled to the second gate driver, the control device selects at least one third selected frame and at least one fourth selected frame in each frame group, the control device transmits a single reset pulse to the second gate driver in each frame of the at least one third selected frame to clear a second scanning pulse in the second gate driver, and the control device transmits a plurality of reset pulses to the second gate driver in each frame of the at least one fourth selected frame to clear the second scanning pulse in the second gate driver at different time points.

27. The display apparatus according to claim 26, wherein the first gate driver is disposed on one of a left side and a right side of the display panel, and the second gate driver is disposed on another one of the left side and the right side of the display panel.

* * * * *